United States Patent
Kotagiri et al.

(10) Patent No.: US 9,594,947 B1
(45) Date of Patent: Mar. 14, 2017

(54) ASPECT RATIO VALIDATION

(71) Applicant: Amazon Technologies, Inc., Seattle, WA (US)

(72) Inventors: Srikanth Kotagiri, Redmond, WA (US); Charles Benjamin Franklin Waggoner, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 84 days.

(21) Appl. No.: 14/503,213

(22) Filed: Sep. 30, 2014

(51) Int. Cl.
  *G06K 9/62* (2006.01)
  *G06K 9/00* (2006.01)
  *H04N 5/262* (2006.01)

(52) U.S. Cl.
  CPC ......... *G06K 9/00241* (2013.01); *H04N 5/262* (2013.01)

(58) Field of Classification Search
  CPC ...... G06K 9/00241; G06T 2207/10016; H04N 5/262; H04N 7/0122; H04N 21/234372
  USPC ..... 348/441, 445, 459, 403.1, 556, 558, 403
  See application file for complete search history.

(56) References Cited

U.S. PATENT DOCUMENTS

| | | | | |
|---|---|---|---|---|
| 6,700,999 B1* | 3/2004 | Yang | ........... | G06K 9/00221 340/5.83 |
| 8,004,506 B2* | 8/2011 | Suzuki | ........... | H04N 7/0122 345/204 |
| 2002/0057369 A1* | 5/2002 | Takechi | ........... | H04N 7/0122 348/558 |
| 2006/0177110 A1* | 8/2006 | Imagawa | ........... | G06K 9/00228 382/118 |
| 2007/0046818 A1* | 3/2007 | Uchino | ........... | H04N 7/0122 348/556 |
| 2007/0097261 A1* | 5/2007 | Smith | ........... | H04N 7/0122 348/445 |
| 2009/0097739 A1* | 4/2009 | Rao | ........... | G06K 9/6292 382/159 |
| 2013/0039579 A1* | 2/2013 | Ahn | ........... | G06T 11/60 382/190 |
| 2013/0169822 A1* | 7/2013 | Zhu | ........... | G06T 7/0018 348/180 |

* cited by examiner

*Primary Examiner* — Samir Ahmed
(74) *Attorney, Agent, or Firm* — Thorpe North & Western LLP

(57) ABSTRACT

A technology for aspect ratio validation is provided. An object may be detected in a visual media presentation. The detected object may be compared to a first candidate aspect ratio object of a same class of objects as the object. The detected object may also be compared to a second candidate aspect ratio object, which may also be of a same class of objects as the detected object. A determination may be made as to which of the first and second candidate aspect ratio objects the object corresponds.

19 Claims, 7 Drawing Sheets

A

B  C  D

ASPECT RATIO VALIDATION

BACKGROUND

Visual media presentations, such as digital video content, are increasingly delivered to consumers via delivery channels such as streaming media or digital downloads. The delivery is typically the transmission of digital video content from a source device to a designated client device via a communications or computer network, and the delivery may be in response to a client request requesting the specific digital video content. The delivery may typically be provided over broadband wide-area networks, such as the Internet, for example. Digital video content may be stored transitorily or non-transitorily as one or more files in a memory of the destination device. Access to the digital video content may be limited to one or more destination devices or to one or more specific user accounts. Access to digital video content may be restricted to a specific time window or may be unrestricted using digital rights management (DRM). Digital video content may include, for example, motion pictures, documentaries, episodes of serial programming, or special features.

Delivery of the digital video content to various types of client devices with different display sizes, aspect ratios, pixel resolutions and so forth often involves the selection of a version of the digital video content encoded to be suitable for the requesting client device configuration. However, digital video content from a provider, such as a streaming media service, may be received from another originating source, such as a content producer or studio. The digital video content from the originating source may not always be encoded at a correct aspect ratio or may have incorrect or missing metadata information identifying an aspect ratio or other feature of the digital video content. In such examples, human interaction at the provider level is conventionally used to view the digital video content and determine whether the digital video content received from the source is encoded properly at an aspect ratio that appears normal. More specifically, a human may need to view to digital video content to determine whether the digital video content is stretched or squeezed in one direction or another.

DETAILED DESCRIPTION

Figure 1:
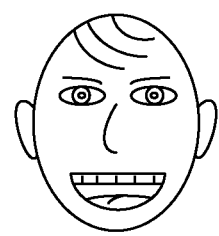
FIG. 1 illustrates a detected face A from a video, as well as a stretched face B, a normal face C and a squeezed face D against which the detected face may be compared to determine whether the detected face is stretched, normal or squeezed in accordance with an example of the present technology.
Figure 1:
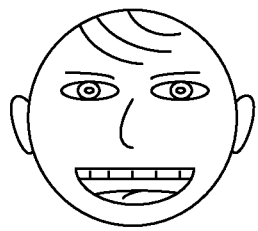
Figure 1:
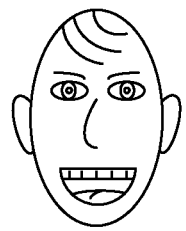
Figure 1:
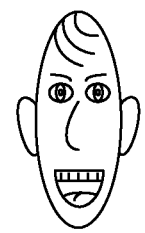

A technology for aspect ratio detection and/or validation is provided. In one example of the present technology, an object may be detected in a visual media presentation, such as a digital video for example. The object may be detected using computer pattern recognition or computer-implemented object detection. The object may be of type included in a class of objects being searched in the visual media presentation. For example, the object may be a face and the computer pattern recognition may be used to search for and detect faces in the visual media presentation and identify a detected object. The detected object (e.g., a face with unknown facial ratios) may be compared to a first candidate aspect ratio object (e.g., a face with known facial ratios). The first candidate aspect ratio object (e.g., a face) may be of a same class of objects as the detected object (e.g., a face). The detected object may also be compared to a second candidate aspect ratio object (e.g., a face), which may also be of a same class of objects as the detected object. An aspect ratio of the first and second candidate aspect ratio objects may be different. A determination may be made as to what is a correct aspect ratio for the detected object and/or whether the detected object has a correctly specified aspect ratio based on the comparisons to the first and second candidate aspect ratio objects. When the visual media presentation specifies an aspect ratio that is incorrect, the visual media presentation may be flagged as having an incorrect aspect ratio.

In another example, an object may be detected in a visual media presentation. The detected object may be compared to a first candidate aspect ratio object of a same class of objects as the object. The detected object may also be compared to a second candidate aspect ratio object, which may also be of a same class of objects as the detected object. A determination may be made as to which of the first and second candidate aspect ratio objects the object corresponds.

In accordance with another example, a method for determining whether a video is being reproduced at a recorded aspect ratio (i.e., the correct aspect ratio) includes detecting faces in a video by analyzing a predetermined amount of the video. For example, the first ten minutes of the video (or any other desired length or duration) may be automatically analyzed to detect faces using face detection software. The detected face(s) can be compared to stretched, squeezed and/or normal faces to identify a quantity of the faces that appear stretched, squeezed and/or normal. The comparison can include determining whether the detected face(s) is/are sufficiently similar to the stretched, squeezed and/or normal faces that the detected face may be reasonably determined to be stretched, squeezed or normal. The number of matches for stretched, squeezed and/or normal faces based on the comparison of the detected faces for the selected time frame of the video can be respectively tallied to determine which quantity of stretched, squeezed and/or normal faces is greater. If the tallied number of normal faces is greatest, the video may be assumed to have a correct aspect ratio. However, when the quantity of stretched faces or squeezed faces is greater than the number of normal faces, the video may be flagged as potentially having an incorrect aspect ratio. In some examples, flagged videos may be flagged for human review, re-encoding at a different aspect ratio and/or notification to the source of the video that the video may have an incorrect aspect ratio.

Some service providers supply streaming video or video on demand services to customers. The service providers typically receive the video in a digital format from a studio, producer, third-party seller or other source. The video received by the service providers generally includes metadata. The metadata may be generated when encoding the master video file. The metadata typically may include the title, the subject matter (in the form of a description), relevant categorical tags, the publication date, the video length, dimensions, thumbnail, and the video author. The dimensions may define the aspect ratio of the video. An aspect ratio refers to the ratio of the width to the height of the video. The metadata indicates the video file's width and height. The formula width/height=aspect ratio is used to determine the aspect ratio. The following table describes how the formula results translate to some common aspect ratio options:

| Formula result | Aspect ratio |
|---|---|
| 1.33 | 4:3 |
| 0.75 | 3:4 |
| 1.78 | 16:9 |
| 0.56 | 9:16 |

It is noted that the ratio of the width to the height of an image is known as the aspect ratio, or more specifically as the Display Aspect Ratio (DAR), being the aspect ratio of the image as displayed if an image is displayed with square pixels, then these ratios agree. If not, then non-square, "rectangular" pixels are used, and these ratios disagree. The aspect ratio of the pixels themselves is known as the Pixel Aspect Ratio (PAR). For square pixels, the PAR is 1:1. Reference to an aspect ratio herein may primarily refer to the picture or Display Aspect Ratio (DAR). A Pixel Aspect Ratio (PAR) correction may refer to a correction factor for how pixels are expressed in an image that may be applied when encoding a video to achieve the desired DAR.

While the videos are intended to have the aspect ratio specified in the metadata, or at least the dimensions for determining the aspect ratio, the videos delivered to the service provider may at times have incorrect dimensions specified or may lack specification of the video dimensions altogether. If the service provider simply encodes the video to the delivery format for the customer, the video may inadvertently be encoded to an incorrect aspect ratio, thus degrading the customer experience of viewing the video, as well as potentially negatively affecting the customer's perception of the video delivery service provided by the service provider. The present technology enables the service provider to programmatically detect visual characteristics of the video to determine whether the dimensions specified in the metadata are likely correct without manual reviewing of the videos one at a time by a human reviewer.

As mentioned previously, the present technology may utilize faces in the video to determine a probable aspect ratio of the video and to determine whether the aspect ratio, or the dimensions by which the aspect ratio is determined, as specified in the metadata, is/are likely correct. Faces in videos may look squeezed or stretched if the video is encoded incorrectly. Videos may typically be flagged for review or flagged as problematic if there is no metadata present or when the existing metadata fails to specify the dimensions. However, when the video includes a specification of the dimensions in the metadata, the present technology also enables a determination of whether there is likely a problem with such a video. If the correct aspect ratio of a video is 4:3 but this information is incorrect or missing and the video was prepared for presentation to the customer anyway, the video may result in a stretched 16:9 ratio or 2.3:1 or some other ratio. Aspect ratio issues with letterboxing can compound the problem. While in some instances, letterboxing may be used to determine whether a video is encoded at a correct aspect ratio, the letterboxing may not always be determinative and any automatic corrections made simply on the basis of letterboxing may result in incorrect encoding of the video.

FIG. 1 illustrates an example face A that may be detected in a video. A large number of videos include human faces. The present technology may be used to find the faces in the video, such as for the entire video or for a certain portion of the video (e.g., the first twenty minutes of the video). After identifying faces in the desired portion of the video, the technology may analyze features of the faces, such as a height of the face, a width of the face, height-to-width ratios or vice-versa, relationships between features on the face, a distance between facial features and so forth. If the features, such as height, width, etc. appear correct, the video may be identified as having a correctly specified aspect ratio (i.e., dimensions).

The present technology may use one or more models to determine whether the video appears correct, squeezed or stretched, where the squeezed and stretched appearances correlate to an incorrectly designated aspect ratio. As will be described in further detail later, incorrectly specified aspect ratios may be compensated for automatically in an attempt to rectify any appearance of squeezed or stretched faces.

FIG. 1 illustrates three faces B, C, D representing models for determining whether the video appears correct. While in practice, such diagrammatic models of stretched and squeezed faces may not actually be used as a tool for comparison to the detected face(s) in the video, here the faces are provided for illustrative purposes. (However, diagrammatic models of stretched and squeezed faces may be used for certain implementations of the technology). It is noted that the stretched face B is stretched in a width-wise direction from the normal face C, and the squeezed face D is squeezed in a width-wise direction from the normal face C, while the height of faces B, C and D is illustrated uniformly. In practice, incorrect aspect ratios may result in distortion of faces, such as a squeezed or stretched width of the faces, or a squeezed or stretched height of the faces. In many cases, proportionality may be a determining factor in whether a face is stretched or squeezed. A stretched face may be a face that is proportionally wider than the normal face, regardless of actual measured dimensions. A squeezed face may be a face that is proportionally narrower than the normal face, regardless of the actual measured dimensions.

The service provider may manually classify faces detected in a set of videos (e.g., a training data set) as being normal, stretched or squeezed. The service provider may use videos that have been manually identified as normal, stretched or squeezed or may use a normal video and intentionally encode the normal video to incorrect aspect ratios to create videos with stretched and squeezed faces.

Data from the training data set may be derived from the normal, stretched and squeezed faces. For example, the service provider may identify a specific range of dimensions of a face as representing a stretched face, another range as representing a normal face, and another range as representing a squeezed face. In some cases, the dimensions may be absolute and use pixels or other units of measurement. When using absolute dimensions to determine whether a face is stretched, squeezed, or normal, scaling or other modifications to the face image from the video may be performed to adjust for a depth of the face in the scene, an angle or rotation of the face and so forth. In another example, the dimensions may be relative. For example, rather than using absolute dimensions of different features of the face, the technology may identify relationships between different portions of the face, such as a ratio of height to width of the face that corresponds to normal, squeezed and stretched faces.

The identification of dimensions or relationships used in identifying faces as being stretched or squeezed, as opposed to normal, may be performed manually, using machine learning, or using any other suitable technique. An example of a machine learned implementation will be described in additional detail later. The technology does not need to perform perfectly to perform satisfactorily. Some videos may be borderline cases for one aspect ratio or another, where either encoding may be largely acceptable to customers. An acceptable error rate may be defined to catch more obvious errors while letting less obvious errors go unflagged. For example, the technology may be used to catch errors where the faces are at least 10% off, or rather at least 10% different than the normal face used for the training data. In FIG. 1, face A does not exactly match any of faces B, C or D and lies somewhere between faces B and C. If the face is determined to more closely correspond to the normal face C, then the video may be encoded at the aspect ratio specified in the metadata for presentation to the customer. However, if the face is determined to more closely correspond to the stretched face B, then the video may be flagged for human review.

As mentioned previously, many videos have known actors or actresses in them, and this actor or actress information may be used to determine whether an actor or actress' face is distorted. The service provider may have information related to the video available for viewing by the customer in determining whether to view the video, and this information may include the title, plot summary, rating, and other information, as well as identification of at least more prominent actors or actresses in the video. For example, the information may designate a video as having Brad Pitt as an actor playing a particular role in the video. Because Brad Pitt is a well-known actor, photos and videos of his face are commonly and publicly available in large numbers from many different angles or views. An available image of Brad Pitt may be assumed to display correct facial dimensions and may be used as a basis for comparison to faces in the video, both to identify which of the detected faces corresponds to Brad Pitt and to further identify whether the dimensions in the video more or less correspond with the dimensions in the image. Comparison of detected faces to images of known faces may be useful to fine tune determination of whether the detected faces in the video are stretched or squeezed. For example, the comparison of the image of Brad Pitt to the detected faces in the video may be performed after comparison of the detected faces in the video to the stretched, squeezed and normal models as a verification that the models have determined correctly whether the faces are stretched, squeezed or normal.

The number of candidate faces at different aspect ratios used for comparison may vary from implementation to implementation. For example, two faces, or three faces, or four or more faces may be used. A "normal" face, as described herein, may refer to an "assumed" or "probable" aspect ratio for the video based on source's metadata, or lacking that, a common aspect ratio for the frame's resolution. The comparison of a detected face to other candidate aspect ratio faces may be a comparison of the assumed, probable, or normal face with one or more potential or alternative aspect ratios. Some example use cases may be as follows:

1. 720×480 frame resolution content which has either a 4:3 aspect ratio (squeezed) or a 16:9 aspect ratio (stretched).
2. 720×576 frame resolution content which has either 4:3 aspect ratio (stretched) or a 16:9 aspect ratio (stretched even more).
3. 960×720 or 1440×1080 frame resolution content which has either a 4:3 aspect ratio (square pixels) or a 16:9 aspect ratio (stretched).

While the present technology is described primarily as applied to video, the present technology may be applied to other types of visual media presentations as well, such as digital images, for example.

Figure 2A:
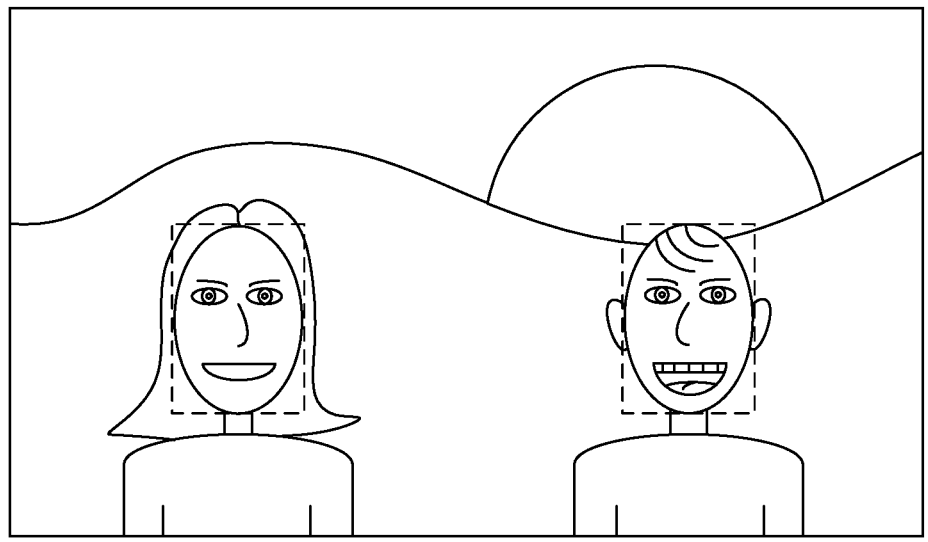
FIGS. 2A-2B illustrate a scene in a video in which faces are detected and where encoding the video to an incorrect aspect ratio (FIG. 2B) results in distortion of the video, in accordance with an example of the present technology.

FIG. 2A illustrates an example video frame having multiple faces. Faces may be detected or identified from the video using computer vision. Computer vision is a field that includes methods for acquiring, processing, analyzing, and understanding images and, in general, data from the video in order to produce numerical or symbolic information, e.g., in the forms of decisions. Specifically, computer vision may be used to approximate some abilities of human vision by electronically perceiving and understanding an image in order to identify faces (or other objects, as the case may be). The understanding of the image may derive information from image data using models constructed with the aid of geometry, physics, statistics, and learning theory, for example.

To apply computer vision to a video and in order to extract some specific piece(s) of information, the video may optionally be pre-processed in order to ensure that the video satisfies certain assumptions implied by the method. Some example pre-processing steps may include: contrast enhancement to ensure that relevant information can be detected; scale space representation to enhance image structures at locally appropriate scales; feature extraction to extract features such as lines, edges, ridges, localized interest points such as corners or blobs or points, and also more complex features such as may be related to texture, shape or motion.

At some point in the processing a decision is made about which image points or regions of the image (e.g., a still or frame from the video) are relevant for further processing. Some example decisions include the selection of a specific set of interest points or segmentation of one or multiple image regions which contain a specific object of interest. While any particular object may be identified, for purposes of the present technology, faces will be identified. Additional detail regarding face detection is provided later. At this step the input is typically a small or reduced set of data, such as a set of points or an image (or video) region which is assumed to contain a specific object, such as a face. Some further processing may be applied to the reduced set of data: an estimation of specific parameters, such as object pose or object size; image recognition to classify a detected object into one or more different categories, such as to classify the face as male, female, adult, child, etc.; image registration to compare and combine multiple different views of the object; and so forth.

A decision may be made as to whether the identified region or points corresponds to an object, such as a face. A further decision may be made as to whether the face matches or corresponds to a known actor's/actress' face. A decision may be made as to whether the detected face more closely corresponds to the one of the face models selected for comparison to the detected face. An additional decision may be made as to whether to flag the video for further human review.

While portions of the discussion herein refer to analysis of video or analysis of a frame or image from the video, it will be appreciated that the technology may be applied to video and images from video without particular limitation.

Face detection is a computer technology that determines the locations and sizes of human faces in digital images or video. Face detection detects faces and ignores anything else, such as buildings, trees, bodies and so forth. Face detection may include face localization. In face localization, the locations and sizes of the detected faces may be determined. While the present technology is described primarily in terms of application to videos to identify faces and determine an aspect ratio of the video and/or whether the faces correspond to a correctly or incorrectly specified aspect ratio in the metadata, the technology may be use objects other than faces to determine the aspect ratio. Face detection is simply a specific case of object-class detection. In object-class detection, the locations and sizes of objects in an image that belong to a given class may be identified. Vehicles, buildings, trees, animals and the like are some examples of different classes.

Every face has numerous, distinguishable landmarks. Some example landmarks include eyes, nose, mouth, a distance between the eyes, a width of the nose, a depth of eye sockets, a shape of cheekbones, a length of the jaw line and so forth. In a similar manner that people have unique fingerprints, these features may define a faceprint representing a specific face. Comparing a faceprint from a detected face in a video may be useful in correlating the detected face with a known actor's/actress' face, which may have an identified faceprint from an image or the like. Use of many of such faceprints may be useful in identifying relationships for faces generally to create an average model of a normal face which may then be used to identify whether a detected face generally matches well with the normal face. Similarly, many faceprints for stretched or squeezed faces may be used to create an average model of a stretched or squeezed face to determine whether a detected face generally matches well with the stretched or squeezed face. The level of specificity of the faceprint may range from very generic to very detailed, depending on a particular application. For example, a simple average faceprint may specify an average height to width ratio of the face or head. A more detailed faceprint may include the identification of a width of the head, a height of the head, width of the eyes, a shape of eyes, eye positioning relative to head height, spacing between eyebrows, spacing between eyes, spacing between eyebrows and eyes, spacing between eyes and cheekbones, spacing between cheekbones and jawline and so forth, optionally each relative to one another or to at least one other specified feature.

In some examples, the average faces, faceprints, feature sizes, ratios, relationships, etc. of the squeezed, stretched and normal models may include a range of proportions, feature sizes, ratios, etc. to be included in the different normal, stretched or squeezed models rather than fixed proportions, sizes, ratios, etc. For example, a particular facial proportion may include a first range for the squeezed model, a second range for the normal model, and a third range for the stretched model. The ranges may optionally include at least some overlap at the edges. Thus, rather than being limited to identifying a face as being closest to one of the models, the face may be borderline one or the other and may be classified as both. The overall number of faces classified by each model may be used to determine whether the video is likely stretched, squeezed, or normal, and classifying some faces in multiple of the categories is not likely to result in a same number of faces associated with each model being the same. In the event that two models produced a same number of face classifications, any overlapping ranges may be reduced or eliminated to more precisely identify a particular model as having the greater number of faces.

While the present technology is not limited to implementations using machine learning, machine learning, such as regression, or other suitable machine learning techniques may be used to look for patterns in the image and then classify the data. Machine learning may be used to identify faces and to further to identify features of the faces identified. Machine learned models may be created for normal or correct aspect ratio faces as well as abnormal or incorrect aspect ratio faces. In one example, three models may be used for normal, stretched and squeezed faces.

Figure 2B:
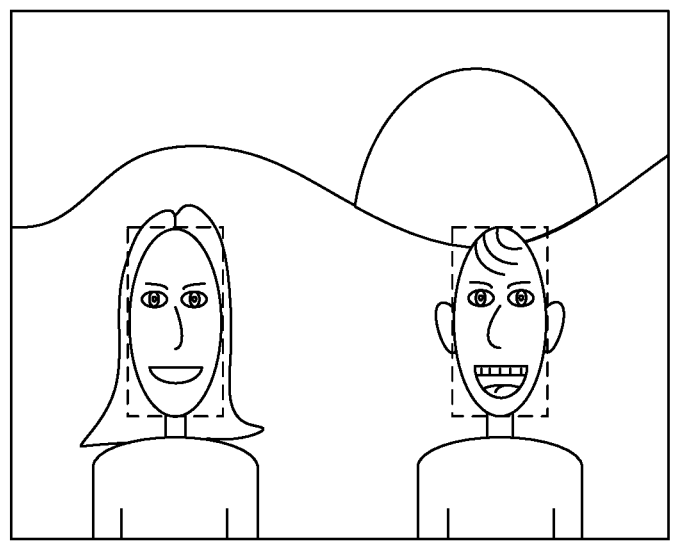

A model for stretched or squeezed faces may be generated by intentionally encoding videos to an incorrect aspect ratio, identifying the faces and features, and creating a model based on the identified features. For example, some current video aspect ratios in use include 4:3, 16:9 and 21:9. A video with a correct aspect ratio of 4:3 may be encoded to the 16:9 and 21:9 aspect ratios, a video with a correct aspect ratio of 16:9 may be encoded to the 4:3 and 21:9 aspect ratios, and/or a video with a correct aspect ratio of 21:9 may be encoded to the 4:3 and 16:9 aspect ratio to create stretched and squeezed videos. For example, a 4:3 aspect ratio video encoded to 16:9 may result in a stretched video and faces in the video may appear stretched. Thus, the machine learning algorithm may identify faces from a 16:9 video encoded from a 4:3 aspect ratio as stretched and create a stretched face model based thereon. FIG. 2A illustrates an example 16:9 aspect ratio video image and FIG. 2B illustrates the same image as it may appear encoded to 4:3, in which detected faces would be identified as squeezed. (It is noted that the images in FIGS. 2A-2B are not necessarily drawn to scale and may not specifically correspond to 16:9 and 4:3 aspect ratios, but are provided simply for illustration purposes illustrating the effect of squeezing a wider format video into a narrower format encoding).

While the model may be created using specific dimensions or ranges of facial features, the ratios or relationships of features may be used as inputs both for creating the model and for applying the model to determine whether a detected face is displayed at a correct aspect ratio. When a video is flagged as likely having an incorrectly specified aspect ratio based on the detected faces, a human may optionally confirm that the determination of the faces detected in the video as stretched or squeezed is correct, which may be used as a further input to refine the model.

While conventional methods for detecting incorrectly encoded videos have involved manual, human inspection or the detection and analysis of letterboxing, the present technology enables the use of face detection to determine whether the aspect ratio is correct.

As another option for detecting the aspect ratio or determining whether a specified aspect ratio is correct, motion vectors of the video may be analyzed. Analysis of motion vectors may be in the place of or in addition to the face detection heretofore described. A motion vector may refer to a two-dimensional vector used for inter-prediction that provides an offset from the coordinates in a decoded picture to the coordinates in a reference picture, where the motion vectors describe a transformation from one 2D (two-dimensional) image to another, usually from adjacent frames in a video sequence. The motion vectors may relate to the whole image (global motion estimation) or specific parts, such as rectangular blocks, arbitrary shaped patches or even per pixel. The motion vectors may be represented by a translational model or many other models that can approximate the motion of a real video camera, such as rotation and translation in all three dimensions and zoom. Part of the video encoding process involves the use of these motion vectors. The data to decode the vectors is present and may be used to determine whether a video aspect ratio is correct. For example, a distribution of motion vectors may be used. A model may be created for an amount of horizontal motion and/or vertical motion typically expected for a video having a correct aspect ratio. The model may be specific to particular genres or categories of video, as some categories may have general distributions that are different than other videos. In a similar manner, a horizontal/vertical motion vector distribution model may be generated for stretched and squeezed videos, where squeezed videos may have a smaller amount of motion in the horizontal direction while stretched videos may have a larger amount of motion in the horizontal direction. If there is an unusually higher amount of one direction or another of the motion as compared with the normal motion vector model, then it may be determined that a specified aspect ratio is incorrect.

As yet another option for detecting whether the specified aspect ratio is correct, spatial frequency data of the video may be analyzed. Specifically, spatial frequency data may be included in intra-blocks and I-frames of the video. The analysis of the spatial frequency data in determining whether an aspect ratio is correct may be similar to the motion vector analysis described above. Specifically, the relative frequency distribution on the horizontal and vertical axes may be used as another way to estimate the pixel aspect ratio. The frequency data may be determined as part of the encoding process or may be calculated by other processes.

Figure 3:
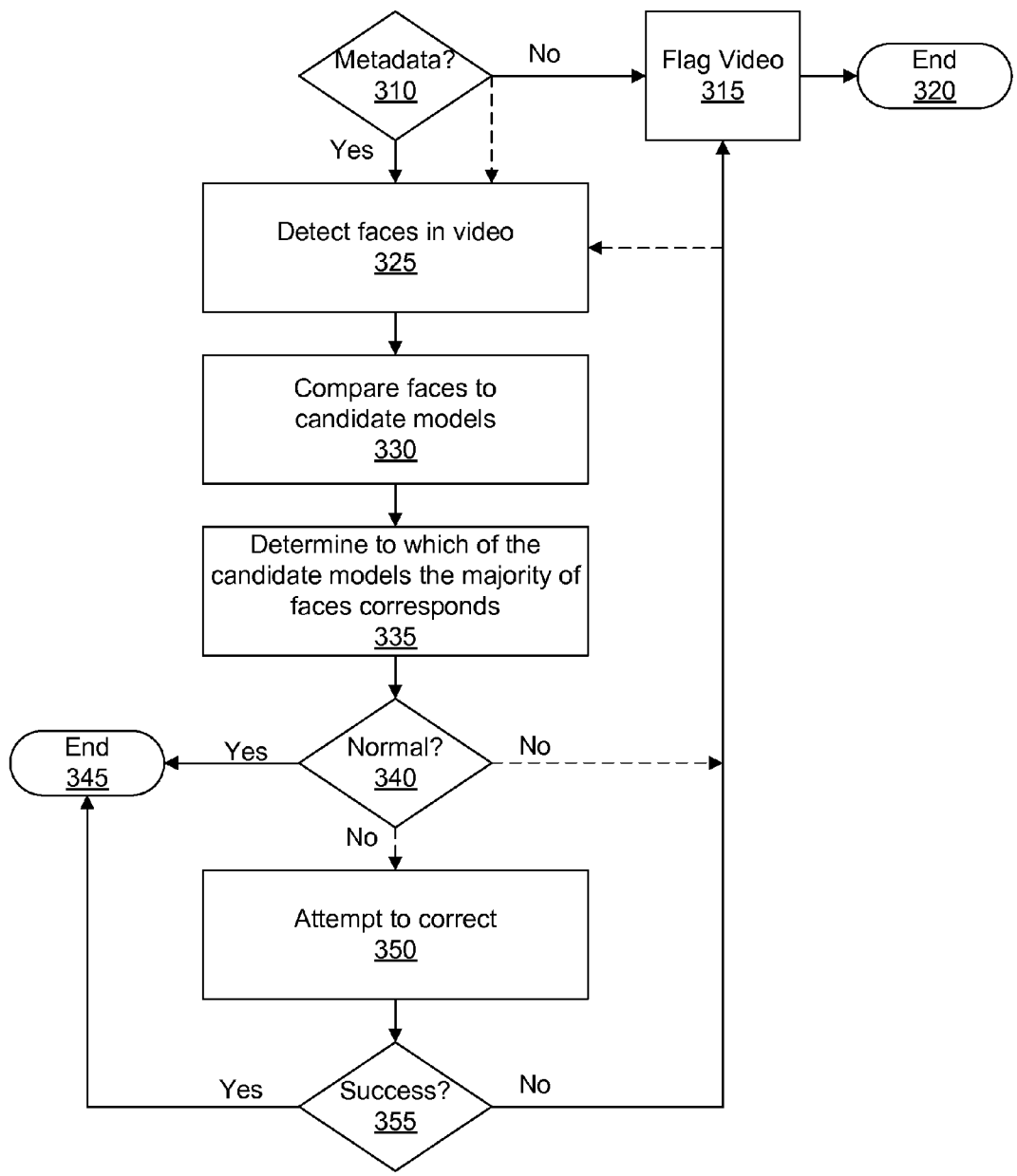
FIG. 3 is a decision diagram of a method for processing a video to verify the aspect ratio of the video in accordance with an example of the present technology.

Reference will now be made to FIG. 3. FIG. 3 illustrates a decision diagram for processing a video. A video may be analyzed at 310 to determine whether metadata is present in the video file or in some instances whether present metadata specifies dimensions of the video (i.e., aspect ratio). If the metadata is not present, the video may be flagged for review at 315 and the process may terminate at 320. However, even if metadata is not present, the process may continue through an analysis of the video in an attempt to identify an aspect ratio of the video or to determine whether an assumption of an aspect ratio for the video is correct, as represented by the dotted line between 310 and 325. If metadata is present and the metadata specifies the dimensions of the video, a segment of the video may be analyzed to detect faces in the segment at 325. As part of the detection of faces, the process may optionally include facial recognition to identify actors and/or actresses in the video and automatically tag the actors/actresses. While faces are the primary focus of this example, any particular object or class of object, animate or inanimate, may be detected and used to determine the accuracy of the specified aspect ratio. For example, rather than detecting faces, cats or cars could be detected.

The process may use computer vision classifiers to look for faces matching two or more aspect ratio models, such as a classifier to look for thin or squeezed faces and another classifier to look for wide or stretched faces at 330. The classifiers may be used to analyze a predetermined amount or duration of video, such as 20 minutes of video for example. After the predetermined portion of the video has been analyzed, the number of faces identified by each of the classifiers may be counted and a determination may be made as to whether the majority of faces identified by the respective classifiers corresponds to one or another of the classifiers at 335. Whichever classifier identified the greatest number of faces results may enable determination of the correct aspect ratio of the video or a determination of whether the video is normal, stretched or squeezed as compared to a specified aspect ratio. For example, if more stretched faces were identified than normal, then the video may be identified as stretched. As another example, if model faces for an assumed aspect ratio have the highest number of results, then the aspect ratio of the video may be determined to be the assumed aspect ratio. As another example, if model faces for an alternative aspect ratio have the highest number of results, then the aspect ratio of the video may be determined to have the alternative aspect ratio.

Continuing with the diagram in FIG. 3, at 340 if the faces are normal, the video aspect ratio may be acceptable and the video may be processed normally. Thus, the process relating to the present technology may end 345. If the faces are not normal, or in other words if the video appears stretched or squeezed or the correct aspect ratio cannot be determined, then the process may optionally proceed to flag the video at 315 and terminate at 320. However, another option for proceeding may be to attempt to correct the video and regenerate the target video with the correct properties at 350.

For example, if the sources supplying the videos to the service provider generally provide the videos in one of five different standard aspect ratios, the video could be encoded in each one of the different aspect ratios and processed according to the method in FIG. 3 in an attempt to discover a correct aspect ratio. As another example, a degree of difference of the stretched or skewed faces from a normal aspect ratio face may be determined and compensation in the determined degree may be made to the original video in an attempt to correct the aspect ratio. The compensated video may be analyzed using the method of FIG. 3 to determine whether the compensation was accurate or sufficient. As another example, the motion vectors or spatial frequency data may be used to determine a degree of difference from what is expected and the video may be compensated to the determined degree based on the motion vectors. As another example, a human may be notified that there is an issue in order to manually attempt to correct the issue. If the attempt to correct is successful at 355, the process may terminate at 345. However, if the attempt to correct is unsuccessful, the video may be flagged 315 and the process may terminate at 320.

While various correction mechanisms may be used to correct incorrectly specified aspect ratios, in some examples, such videos may simply be flagged at 315 and a notification may be sent to the source to correct the issue. The present technology may be used to catch potential encoding errors before the video is made available to the customer to avoid complaints from the customer.

The analysis method of FIG. 3 may be performed on an encoded video, but may alternatively be performed before the source video is encoded to reduce processing overhead for multiple encodings if the method determines that the aspect ratio is incorrect.

While FIG. 3 shows the method as simply flagging the video when the metadata is not present or at least when the metadata fails to specify the video dimensions, the method may optionally proceed even when the metadata is missing by assuming the aspect ratio is one of the five standard aspect ratios supplied by the video sources similarly as was described previously in the context of correcting an incorrectly specified aspect ratio. Without the correct metadata, the video can be interpreted the wrong way. For each video, there is one correct aspect ratio. Metadata, including the dimensions or aspect ratio, may be set when a target video is generated from the source video.

Figure 4:
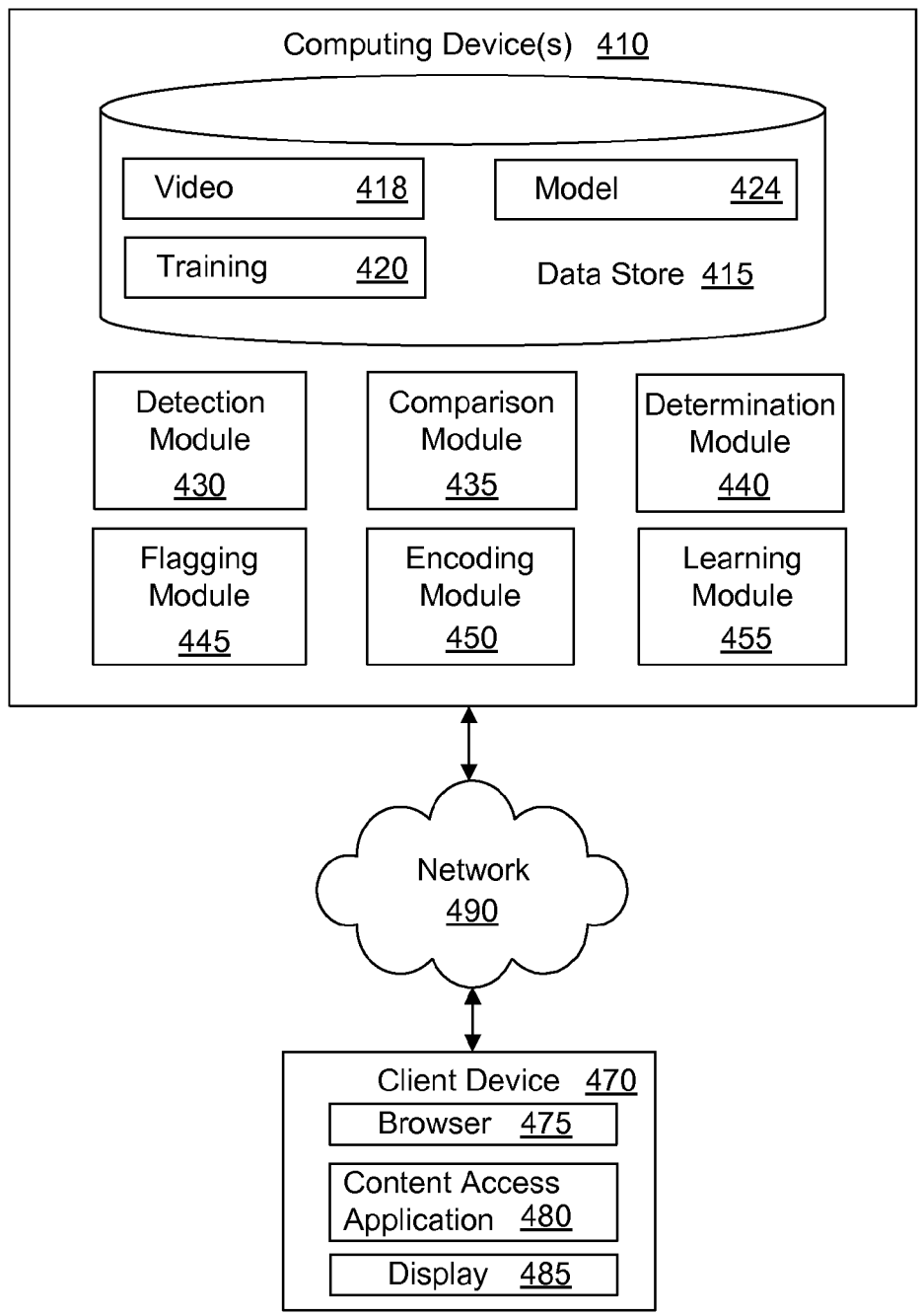
FIG. 4 is a block diagram of a computing system for verifying the aspect ratio of a video in accordance with an example of the present technology.

Reference will now be made to FIG. 4. FIG. 4 illustrates a system for determining whether a video specifies the correct aspect ratio in accordance with an example of the present technology.

In one example, a service provider environment may include any number of server computers or other computing devices 410. Software on the computing device 410 may be an application or a computer program, such as may be designed to perform an activity, such as analyzing data, comparing data, flagging data, encoding data, generating learning models from data and so forth. Applications executable on the computing device 410 and in the service provider environment may be any suitable type or form or application as may be appreciated.

The system may include one or more data stores 415. The data store 415 may include or be configured to store any of a variety of useful types and formats of data. For example, the data store 415 may include a video data store 418 for storing video received from a source, as well as video encoded for provisioning to a variety of different clients. The data store 415 may also include a training data store 420 for storing training data for use in creating models for identifying different candidate aspect ratio objects in examples where machine learning is used. The data store 415 may further include a model data store 424 for storing the machine learned models created.

The term "data store" used herein may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

The system may include any number of modules useful for enabling the aspect ratio evaluation technology and for providing the video on demand service from the computing device(s) 410. For example, the system may include a detection module 430 to detect faces or other objects in a video segment. The system may include a comparison module 435 to compare the detected faces to multiple candidate faces (which may, for example, be squeezed or stretched as has been described). In one example, the detection module 430 and the comparison module 435 may be combined or may be conflated as a singular module where a detection of a face occurs when one of the candidate aspect ratio models matches a region in a video.

The system may include a determination module 440 to determine which of the candidate aspect ratio faces is more prevalent among the detected faces to determine an aspect ratio of the video. The system may include a flagging module 445 to flag videos that are identified as squeezed or stretched according to an aspect ratio specified in the metadata. Flagged videos may be automatically corrected in some instances or may be flagged for review and/or correction by a human (either at the service provider or the video source). Correct videos may be encoded by an encoding module 450 for the variety of different client devices (see, e.g., client device 470) accessing the video. The system may further include a learning module 455 to learn the machine learned models used to identify the candidate aspect ratio faces when machine learning is used as part of the system.

In one example, a video feed may be analyzed using a face detection algorithm. Once a face is detected, the system can utilize a relative orientation-determining algorithm to attempt to determine whether the person corresponding to the detected face is facing substantially towards the camera. In response to a determination that the person is facing substantially towards the camera, a corresponding frame of the video can be selected for processing, such as to perform facial recognition on the portion of the image frame corresponding to the user's head or to enable comparison of the face in the image frame to images of known actors/actresses in the video.

Processing the entire video using facial recognition algorithms or other such processes may be resource intensive. As a result, a limited segment of the video may be processed. Also, an approach in accordance with certain examples may use subsequent frames or may monitor a subset of determined local features to attempt to identify the presence of a person's head or face or other feature or object in the video. For example, an algorithm may look for a contour or shape that matches the shape of a human head within a specified level or range of certainty. Upon detecting such a shape or contour, the system may track a relative position or area in the captured image information corresponding to the person's head. Approaches for detecting and tracking shapes or contours are known in the art and as such will not be discussed herein in detail. Further, while tracking is being performed, a determination is made of whether the head is sufficiently clear or oriented in a suitable direction for comparison to the candidate aspect ratio models. Once the position of a person's head is determined, that feature can be tracked without having to re-determine that the feature is a person's head (unless, for example, the head is out of the image for a minimum amount of time). When tracking a face over time, an assumption may be made that the point where the pupils are relatively the furthest apart is likely when the face is most oriented towards the camera. When there is head rotation in the video where the pupils grow farther apart and then closer together, a higher confidence that the face is oriented towards the camera may be determined when the pupils are at a maximum distance during the head rotation.

In some examples, the mere presence of two pupil-like features corresponding to the detected head position might be sufficient to select a corresponding image frame for processing. Other factors such as a relative position and/or separation of those features (e.g., pupils) in the detected head position may also be considered. For example, some processes may analyze the separation between the pupil features to determine whether the person is looking substantially towards the image capture element. For typical persons, there is a range of pupil separation (as a percentage or fraction of head width) that will correspond to a person facing substantially towards the image capture element. Thus, in some examples, an image may not be selected for processing even when a head or face is detected if the pupils are sufficiently off-center or have a separation indicating that the person is likely not looking substantially towards the camera, at least if a more suitable image is available.

The learning module may learn a variety of different aspects or features of faces or other objects for use in creating models for determining whether the video specifies the correct aspect ratio. Machine learning may be an effective tool for use in optimizing identification of features of faces or objects. Machine learning may take empirical data as input, such as data from the variety of correctly and incorrectly encoded videos, and yield patterns or predictions which may be representative of the shapes or transformations of the objects in the videos when encoded correctly or incorrectly. Machine learning systems may take advantage of data to capture characteristics of interest having an unknown underlying probability distribution. Machine learning may be used to identify possible relations between observed variables. Machine learning may also be used to recognize complex patterns and make machine decisions based on input data. In some examples, machine learning systems may generalize from the available data to produce a useful output, such as when the amount of available data is too large to be used efficiently or practically. As applied to the present technology, machine learning may be used to detect to an average normal face, or squeezed face, or stretched face, based on newly analyzed video, administrator or customer feedback, and so forth.

Machine learning may be performed using a wide variety of methods of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, subsymbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Another example of machine learning includes data pre-processing. Specific details regarding any of the examples of supervised, unsupervised, temporal difference or other machine learning described in this paragraph that are generally known are also considered to be within the scope of this disclosure.

One type of machine learning in particular involves using a Haar classifier. Use of a Haar feature classifier in face detection is known and the application of the Haar classifier to the present technology will be understood by those having skill in the art.

Client devices 470 may access video data, flagged videos, services and so forth via the computing device 410 in the service provider environment over a network 490. Example client devices 470 may include, but are not limited to, a desktop computer, a laptop, a tablet, a mobile device, a television, a cell phone, a smart phone, a hand held messaging device, a personal data assistant, an electronic book reader, heads up display (HUD) glasses or any device with a display 485 that may receive and present the video content.

The system may be implemented across one or more computing device(s) 410 in the service provider environment and including client devices 470 connected via a network 490. For example, a computing device 410 may include a data store and various engines and/or modules such as those described above and such modules may be executable by a processor of the computing device. The system may be implemented as a plurality of computing nodes or computing instances, each of which comprises at least one processor and a memory, where the computing nodes are configured to collectively implement the modules, data stores and so forth.

The modules that have been described may be stored on, accessed by, accessed through, or executed by a computing device 410. The computing device 410 may comprise, for example, a server computer or any other system providing computing capability. Alternatively, a plurality of computing devices 410 may be employed that are arranged, for example, in one or more server banks, blade servers or other arrangements. For example, a plurality of computing devices 410 together may comprise a clustered computing resource, a grid computing resource, and/or any other distributed computing arrangement. Such computing devices may be located in a single installation or may be distributed among many different geographical locations. For purposes of convenience, the computing device 410 is referred to herein in the singular form. Even though the computing device 410 is referred to in the singular form, however, it is understood that a plurality of computing devices 410 may be employed in the various arrangements described above.

Various applications and/or other functionality may be executed in the computing device 410 according to various implementations, which applications and/or functionality may be represented at least in part by the modules that have been described. Also, various data may be stored in a data store that is accessible to the computing device 410. The data store 415 may be representative of a plurality of data stores as may be appreciated. The data stored in the data store 415, for example, may be associated with the operation of the various modules, applications and/or functional entities described. The components executed on the computing device 410 may include the modules described, as well as various other applications, services, processes, systems, engines or functionality not discussed in detail herein.

The client device 470 shown in FIG. 4 may be representative of a plurality of client devices 470 that may be coupled to the network 490. The client device(s) 470 may communicate with the computing device over any appropriate network, including an intranet, the Internet, a cellular network, a local area network (LAN), a wide area network (WAN), a wireless data network or a similar network or combination of networks.

The client device 470 may include a display 485. The display 485 may comprise, for example, one or more devices such as cathode ray tubes (CRTs), liquid crystal display (LCD) screens, gas plasma based flat panel displays, LCD projectors, or other types of display devices, etc.

The client device 470 may be configured to execute various applications such as a browser 475, a respective page or content access application 480 for an electronic retail store and/or other applications. The browser 475 may be executed in a client device 470, for example, to access and render content pages, such as web pages or other network content served up by the computing device 410 and/or other servers. The content access application 480 may be executed to obtain and render for display content features from the server or computing device, or other services and/or local storage media.

In some implementations, the content access application 480 may correspond to code that is executed in the browser 475 or plug-ins to the browser 475. In other implementations, the content access application 480 may correspond to a standalone application, such as a mobile application. The client device may be configured to execute applications beyond those mentioned above, such as, for example, mobile applications, email applications, instant message applications and/or other applications. Customers at client devices 470 may access content features through content display devices or through content access applications 480 executed in the client devices 470.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

It should be appreciated that although certain implementations disclosed herein are described in the context of computing instances or virtual machines, other types of computing configurations can be utilized with the concepts and technologies disclosed herein. For instance, the technologies disclosed herein can be utilized directly with physical hardware storage resources or virtual storage resources, hardware data communications (i.e., networking) resources, I/O hardware and with other types of computing resources.

Figure 5:
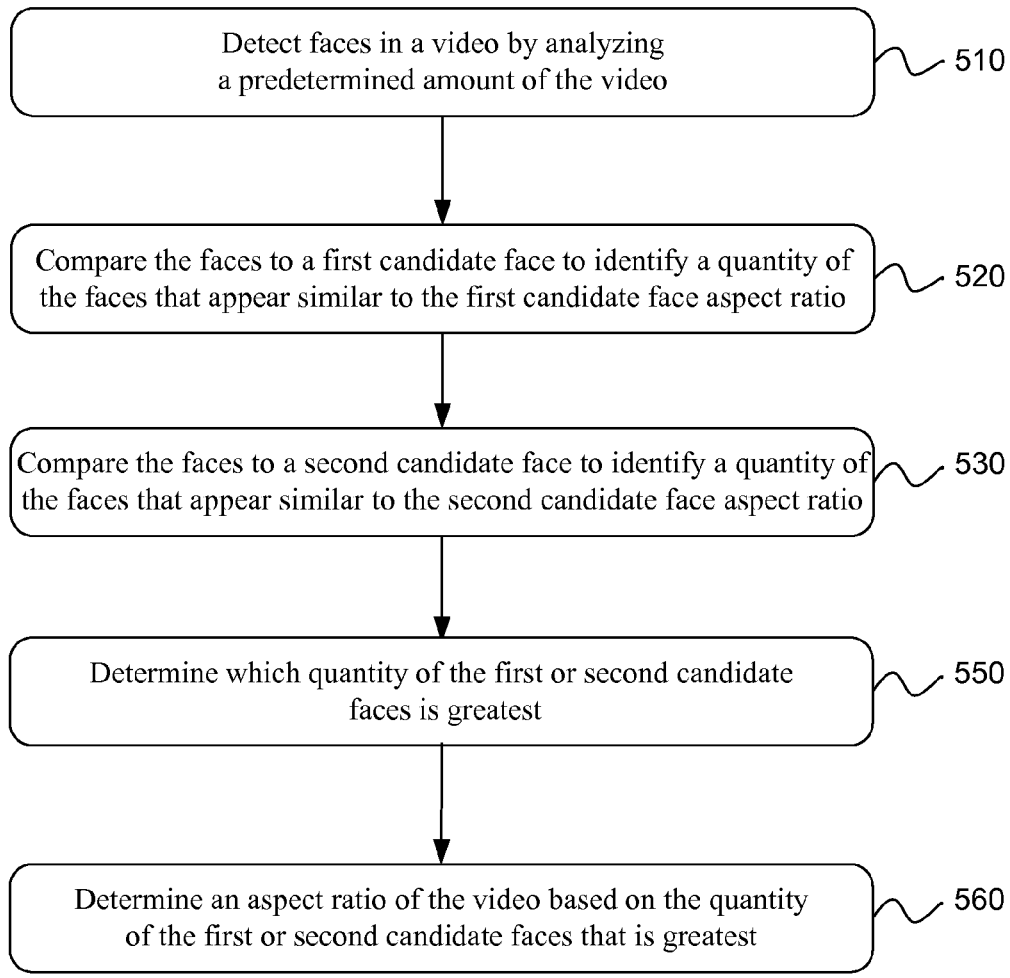
FIGS. 5-6 are flow diagrams for methods of verifying a video aspect ratio in accordance with examples of the present technology.
Figure 6:
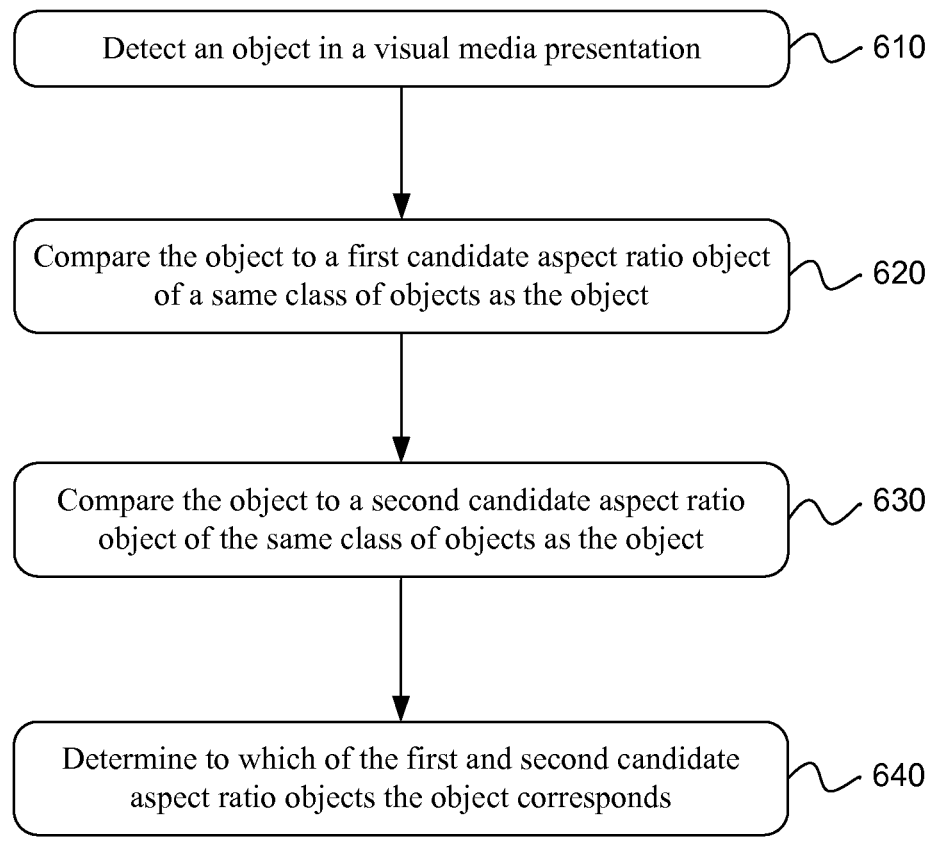

FIGS. 5-6 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Additional example details, operations, options, variations, etc. that may be part of the method have been described previously herein and/or are described in further detail below. Various systems, devices, components, modules and so forth for implementing the method may also be used, as described with respect to the various examples included in this disclosure.

Referring now to FIG. 5, a flow diagram of a method for determining whether a video is being reproduced at a recorded aspect ratio (i.e., a correct aspect ratio) is illustrated in accordance with an example of the present technology. The method may include being implemented on a computing device that is configured to facilitate organization of the streaming data. The computing device may include a processor, a memory in electronic communication with the processor, and instructions stored in the memory. The instructions may be executable by the processor to perform the method of FIG. 5.

The method may include detecting 510 faces in a video by analyzing a predetermined amount of the video. For example, the first ten minutes of the video (or any other desired length or duration) may be analyzed to detect faces using face detection software. The detected face(s) can be compared 520, 530 to first and second candidate aspect ratio faces to identify a quantity of the faces that appear similar to an aspect ratio of the first or second candidate aspect ratio faces. The comparison can include determining whether the detected face(s) is/are sufficiently similar to the candidate aspect ratio faces that the detected face may be reasonably determined to be correspond to an aspect ratio of one of the candidate aspect ratio faces. The number of identifications of faces based on the comparison of the detected faces for the selected time frame of the video can be respectively counted to determine 550 which quantity of candidate aspect ratio faces is greater. The aspect ratio of the video may be determined 560. If the tallied number of an assumed or probable aspect ratio face is greatest, the video may be assumed to have the assumed aspect ratio. However, when the quantity of alternative aspect ratio faces is greater, then the video may be identified as having the alternative aspect ratio. If the determined aspect ratio differs from a specified aspect ratio, the video may be flagged as potentially specifying an incorrect aspect ratio.

The method may include generating stretched or squeezed faces by distorting a normal face, such as by encoding a normal face at an aspect ratio known to be incorrect. The method may also involve using a computer vision classifier, such as a Haar classifier, to detect the faces and to determine which quantity of stretched, squeezed or normal faces is greater. In one example, the detection of faces and comparison of faces to the normal, stretched and squeezed faces may occur substantially simultaneously or be the same step. For example, a stretched face may be identified when a face matching a stretched model is identified, but because the face is stretched, the stretched face may not otherwise be identified by the normal or squeezed models. In other words, the models may be used to identify the faces. Alternatively, the faces may be identified and then subsequently compared to the models.

Referring now to FIG. 6, a flow diagram of a method for aspect ratio verification is illustrated in accordance with an example of the present technology. The method may be operable to verify whether a specified aspect ratio in metadata of a visual media presentation, such as a digital video, is accurate. The method may include detecting 610 an object (e.g., a face) in the visual media presentation. The object may be detected using computer vision or computer-implemented object detection. The object may be of a class of objects being searched in the visual media presentation. For example, the object may be a face and the computer vision may be used to search for and detect faces in the visual media presentation. The detected object may be compared 620 to a first candidate aspect ratio object. The first candidate aspect ratio object may be of a same class of objects as the detected object. The detected object may also be compared 630 to a second candidate aspect ratio object, which may also be of a same class of objects as the detected object. A determination 640 may be made as to whether the detected object has the aspect ratio of the first or second candidate aspect ratio objects based on the comparisons to the correct and incorrect aspect ratio objects and the aspect ratio of the video may be identified. If the identified aspect ratio differs from a specified aspect ratio, the visual media presentation may be flagged as having an incorrect aspect ratio. The method may include sending a notification to a provider or source of the visual media presentation for flagged visual media presentations to notify the provider that there is an issue or problem with the metadata.

The method may in some examples include modifying a correct aspect ratio object to create an incorrect aspect ratio object for use as one of the candidate aspect ratio objects if determining whether the video is stretched or squeezed by encoding the visual media presentation to a different aspect ratio. When multiple potential aspect ratios are possible for a given frame resolution or frame size (i.e., height and width, in pixels), multiple models or candidate aspect ratio objects for the different potential aspect ratios may be used (which may have been generated in advance of evaluation of the video) as the candidate aspect ratio objects. The method may include comparing the object to a plurality of variously proportioned objects corresponding to a plurality of different aspect ratios respectively to identify with which of the differently proportioned objects the object most closely corresponds in order to determine how to correct the visual media presentation aspect ratio. As another example method for correcting the visual media presentation aspect ratio, the method may include determining a difference in specified aspect ratio of the video compared to a correct aspect ratio. For example, the visual media presentation may be modified based on this difference in aspect ratio to compensate for a proportionality difference. When a proportional difference is small, the difference may be ignored, and the visual media presentation may be identified as suitable for presentation to a customer. However, when a proportional difference is greater than a predetermined percentage difference, then the visual media presentation may be flagged. Proportionality may be determined by identifying ratios or relationships of features of the object in the visual media presentation.

When the object detected in the visual media presentation can be appropriately scaled or otherwise correctly viewed relative to the correct aspect ratio object, specific dimensions or ranges of dimensions of features of the object in the visual media presentation may be identified and compared against the specific dimensions or ranges of dimensions of features of the first or second candidate aspect ratio objects in order to determine whether the detected object has a same or similar aspect ratio.

The method may include identifying a person in the visual media presentation and retrieving an image of the person or data related to facial features or proportions of the person. A face of the person known to be in the visual media presentation may be identified in the visual media presentation. The face may be compared to a properly proportioned face image of the known person (e.g., the image retrieved) or to the data related to the facial features or proportions of the person to determine whether the face in the video is properly proportioned.

In one example, the method may include detecting an object in a visual media presentation; comparing the object to a first candidate aspect ratio object of a same class of objects as the object; comparing the object to a second candidate aspect ratio object of the same class of objects as the object; and determining to which of the first and second candidate aspect ratio objects the object being analyzed corresponds. The first and second candidate aspect ratio objects may be stretched, squeezed or normal corresponding to any of a variety of available aspect ratios. However, in one example, rather than comparing the object, or an aspect ratio of the object, to incorrect aspect ratio objects, objects in a plurality of different correct aspect ratios may be compared to the object. When the object more closely corresponds to one of these candidates than another, the aspect ratio of that candidate may be identified as the aspect ratio of the object. In some examples, rather than blindly attempting to compare the object to a large number of potential candidates, one or two candidates may be selected as a best guess for what is likely the correct aspect ratio and may be compared against the object to determine whether the guess or hypothesis is correct.

Similarly as mentioned in the description of the method illustrated in FIG. 5, additional example details, operations, options, variations, etc. that may be part of the method illustrated in FIG. 6 have been described previously herein and/or are described in further detail below. Various systems, devices, components, modules and so forth for implementing the method may also be used, as described with respect to the various examples included in this disclosure.

Figure 7:
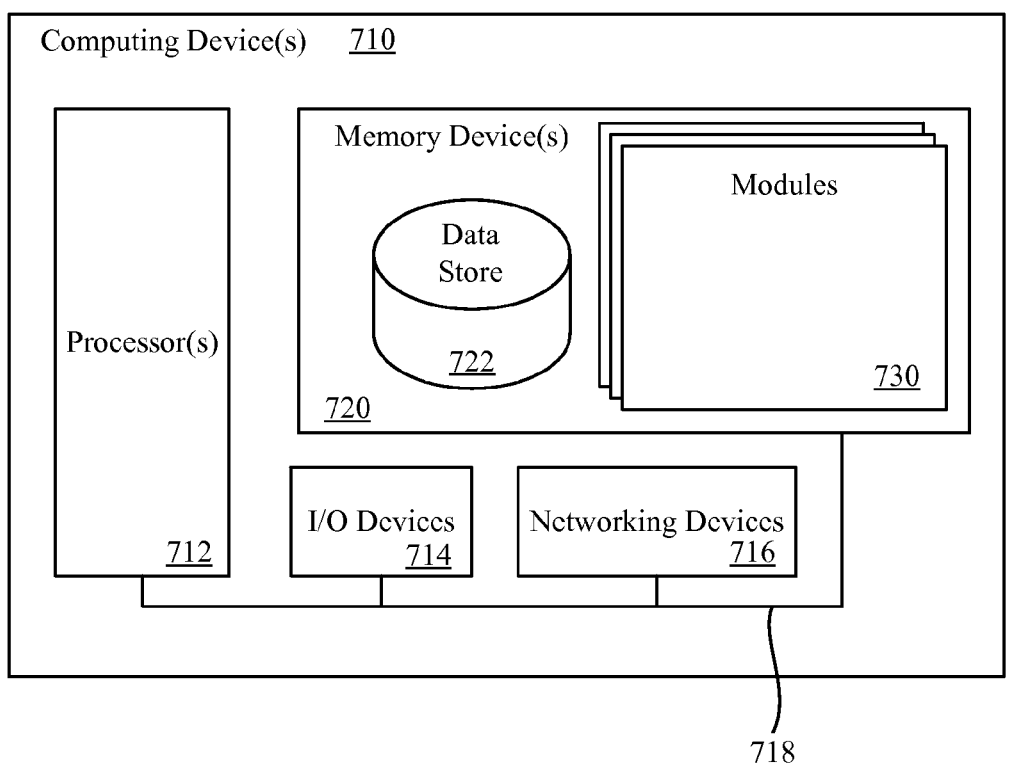
FIG. 7 is a block diagram of a computing system for verifying a video aspect ratio in accordance with an example of the present technology.

FIG. 7 illustrates a computing device 710 on which services or modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 730 that are executable by the processor(s) and data for the modules. A data store 722 may also be located in the memory device 720 for storing data related to the modules and other applications along with an operating system that is executable by the processor(s) 712.

The computing device 710 may further include or be in communication with a client device, which may include a display device. The client device may be available for an administrator to use in interfacing with the computing device 710, such as to review operation of the video processing, to make improvements to machine learning face detection models and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A computer-implemented method, comprising:
    detecting an object in a visual media presentation;
    comparing the object to a first candidate aspect ratio object of a same class of objects as the object;
    comparing the object to a second candidate aspect ratio object of the same class of objects as the object;
    determining a difference in aspect ratio of the object as compared to the first or second candidate aspect ratio objects by comparing proportions of the object with proportions of the first or second candidate aspect ratio objects; and
    determining to which of the first and second candidate aspect ratio objects the object corresponds.

2. The method of claim 1, further comprising modifying an aspect ratio of the first candidate aspect ratio object to create the second candidate aspect ratio object.

3. The method of claim 1, further comprising modifying the visual media presentation based on the difference in aspect ratio.

4. The method of claim 1, further comprising flagging the visual media presentation as having an incorrect aspect ratio when one of the first or second candidate aspect ratio objects has an incorrect aspect ratio and an aspect ratio of the object is similar to an aspect ratio object of the one of the first or second candidate aspect ratio objects.

5. The method of claim 4, further comprising sending a notification to a provider of the visual media presentation of the flagged visual media presentation representing that the visual media presentation has the incorrect aspect ratio.

6. The method of claim 1, further comprising determining that the object has an incorrect aspect ratio when a difference between an aspect ratio of the object and an aspect ratio of one of the first or second candidate aspect ratio objects is greater than a predetermined percentage difference.

7. The method of claim 1, further comprising identifying a face of a known person in the visual media presentation as the object and comparing the face to a properly proportioned face image of the known person.

8. The method of claim 1, further comprising using machine learning to learn to identify an aspect ratio of the visual media presentation based on the comparison of the object to the first or second candidate aspect ratio objects.

9. The method of claim 1, wherein comparing the object to the first or second candidate aspect ratio objects further comprises scaling the first or second candidate aspect ratio objects to a same size as the object and identifying specific dimensions or ranges of dimensions of features of the object in the visual media presentation.

10. The method of claim 1, further comprising identifying ratios of features of the object in the visual media presentation.

11. The method of claim 1, further comprising determining whether an aspect ratio of the visual media presentation is correct and regenerating the visual media presentation with a correct aspect ratio when the aspect ratio of the visual media presentation is incorrect.

12. A computer-implemented method, comprising:
    detecting an object in a visual media presentation;
    comparing the object to a first candidate aspect ratio object of a same class of objects as the object;
    comparing the object to a second candidate aspect ratio object of the same class of objects as the object;
    determining to which of the first and second candidate aspect ratio objects the object corresponds; and
    flagging the visual media presentation as having an incorrect aspect ratio when one of the first or second candidate aspect ratio objects has an incorrect aspect ratio and an aspect ratio of the object is similar to an aspect ratio object of the one of the first or second candidate aspect ratio objects.

13. The method of claim 1, further comprising modifying an aspect ratio of the first candidate aspect ratio object to create the second candidate aspect ratio object.

14. The method of claim 1, further comprising determining a difference in aspect ratio of the object as compared to the first or second candidate aspect ratio objects by comparing proportions of the object with proportions of the first or second candidate aspect ratio objects.

15. The method of claim 1, further comprising sending a notification to a provider of the visual media presentation of the flagged visual media presentation representing that the visual media presentation has the incorrect aspect ratio.

16. The method of claim 1, further comprising determining that the object has an incorrect aspect ratio when a difference between an aspect ratio of the object and an aspect ratio of one of the first or second candidate aspect ratio objects is greater than a predetermined percentage difference.

17. A non-transitory machine readable storage medium having instructions embodied thereon, the instructions when executed cause a processor to perform a method, the method comprising:
  detecting an object in a visual media presentation;
  comparing the object to a first candidate aspect ratio object of a same class of objects as the object;
  comparing the object to a second candidate aspect ratio object of the same class of objects as the object;
  determining to which of the first and second candidate aspect ratio objects the object corresponds; and
  flagging the visual media presentation as having an incorrect aspect ratio when one of the first or second candidate aspect ratio objects has an incorrect aspect ratio and an aspect ratio of the object is similar to an aspect ratio object of the one of the first or second candidate aspect ratio objects.

18. The non-transitory machine readable storage medium of claim 17, further comprising determining a difference in aspect ratio of the object as compared to the first or second candidate aspect ratio objects by comparing proportions of the object with proportions of the first or second candidate aspect ratio objects.

19. The non-transitory machine readable storage medium of claim 17, further comprising determining whether an aspect ratio of the visual media presentation is correct and regenerating the visual media presentation with a correct aspect ratio when the aspect ratio of the visual media presentation is incorrect.

* * * * *